(No Model.) 6 Sheets—Sheet 1.
R. ADAMS.
COMBINED DOOR SPRING AND CHECK.

No. 525,643. Patented Sept. 4, 1894.

(No Model.) 6 Sheets—Sheet 2.
R. ADAMS.
COMBINED DOOR SPRING AND CHECK.
No. 525,643. Patented Sept. 4, 1894.
FIG. 3
FIG. 4
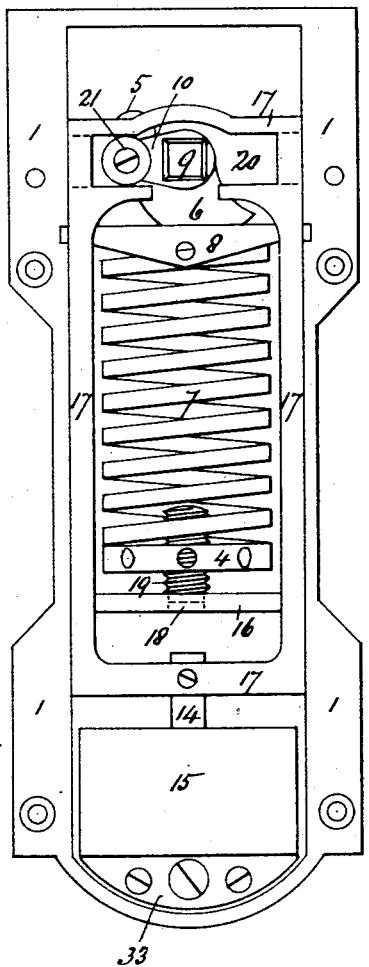
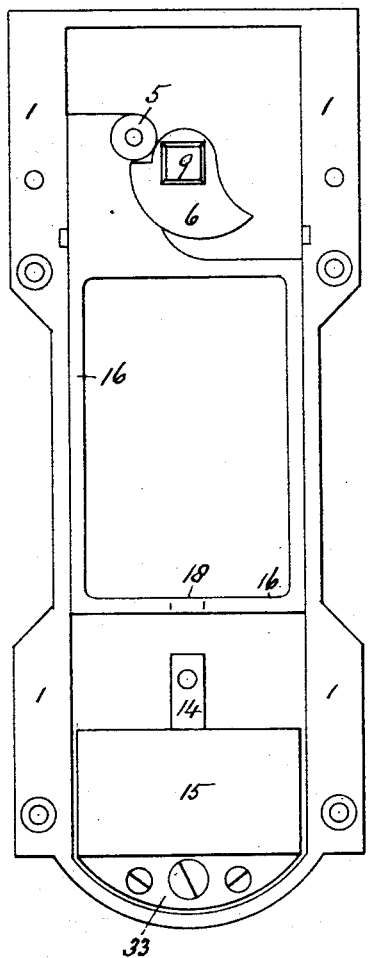
Witnesses
J. A. Saul
Thos. A. Green
Inventor
Robert Adams
by James L. Norris
Atty.

(No Model.) 6 Sheets—Sheet 3.
R. ADAMS.
COMBINED DOOR SPRING AND CHECK.

No. 525,643. Patented Sept. 4, 1894.

Witnesses.
J. A. Saul
Thos. A. Green

Inventor
Robert Adams
by James L. Norris
Atty.

(No Model.) 6 Sheets—Sheet 4.
R. ADAMS.
COMBINED DOOR SPRING AND CHECK.

No. 525,643. Patented Sept. 4, 1894.

Witnesses.
J. A. Saul
Thos. A. Green

Inventor.
Robert Adams.
by James L. Norris.
Atty.

(No Model.) 6 Sheets—Sheet 5.
R. ADAMS.
COMBINED DOOR SPRING AND CHECK.

No. 525,643. Patented Sept. 4, 1894.

Witnesses
J. A. Saul
Thos. A. Green

Inventor
Robert Adams
by James L. Norris
Atty.

(No Model.)  R. ADAMS.  6 Sheets—Sheet 6.
COMBINED DOOR SPRING AND CHECK.

No. 525,643.  Patented Sept. 4, 1894.

UNITED STATES PATENT OFFICE.

ROBERT ADAMS, OF LONDON, ENGLAND.

COMBINED DOOR SPRING AND CHECK.

SPECIFICATION forming part of Letters Patent No. 525,643, dated September 4, 1894.

Application filed November 15, 1893. Serial No. 491,005. (No model.) Patented in England March 4, 1893, No. 8,940.

*To all whom it may concern:*

Be it known that I, ROBERT ADAMS, engineer, a subject of the Queen of Great Britain, residing at 67 Newington Causeway, London, England, have invented certain new and useful Improvements in Springs for Doors and Checks for Preventing Slamming, (for which I have obtained a patent in Great Britain, No. 8,940, bearing date May 4, 1893,) of which the following is a specification.

My invention relates to the class of door springs and checks described in my former patent, No. 455,649; and the object of my present invention is to effect further improvements therein.

In order that my said invention may be particularly described and ascertained, reference is hereby made to the accompanying drawings, in which similar figures of reference indicate corresponding parts.

Figure 1:
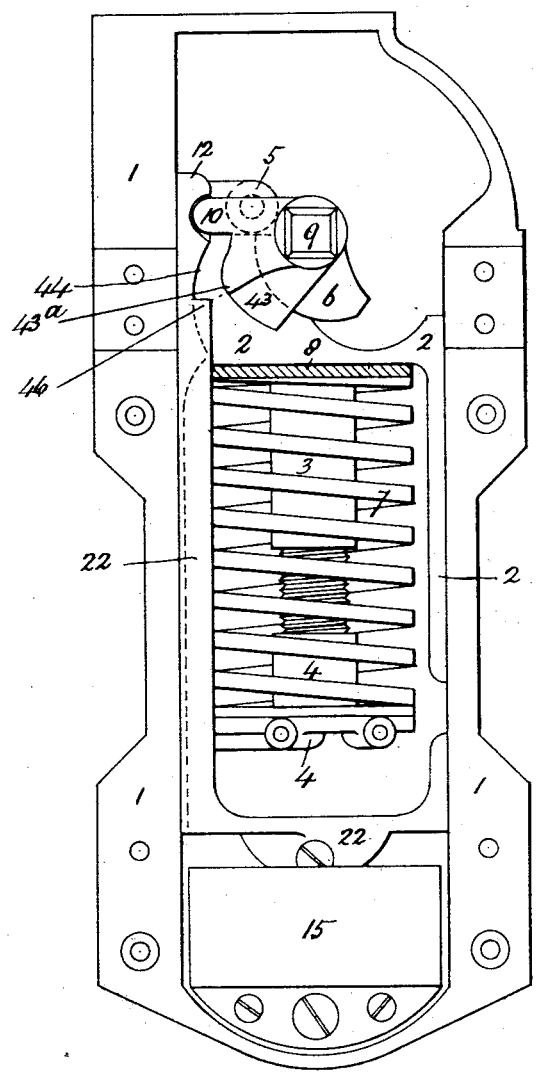
Figure 2:
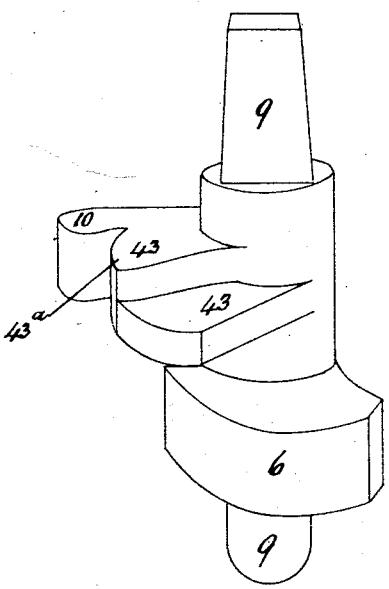

Figure 1 is a plan of a single-acting door spring and check, with the cover plate removed. Fig. 2 is an enlarged perspective view of the cam spindle. Figs. 3 to 15 illustrate other methods of effecting my improvements by means of equivalent devices.

Referring to Figs. 1 and 2: 1 is the cast iron box. 2 is an improved frame, formed to slide freely in the box 1, and communicating the power of the spring 7 to the spindle 9, by means of the roller 5 fitted to the frame 2, and operating upon the cam 6. The frame 2 is formed with forked guides, one of which is shown in Fig. 1 on the right hand side; that on the left hand side being covered by the check frame 22. The check frame is also guided in the box, and is connected with the check 15 in the usual manner. The rod 3 is formed in one with the frame 2, one end of the rod 3 being screw threaded to receive the regulating nut 4, whereby the spring is compressed between the nut 4 and the stationary fence plate 8. 10 is a tooth formed in one with the cam 43. This cam 43 is so formed as to act as a Geneva stop in combination with the recess 44 formed for that purpose in the bar 22. The cam 43 has a shoulder 43ª, which engages with the shoulder 46, on the check frame 22, when the door is closing. On the opening of the door the tooth 10 lifts the frame 22 by contact with the tooth 12, and raises the piston of the check, until the cam 43 holds the frame 22 at rest. On the closing of the door by the action of the spring 7 upon the cam 6, the shoulder 43ª meshes with the shoulder 46, driving the frame 22 and check piston inward, and causing the check to resist the sudden closing of the door. On the further revolution of the spindle 9, the tooth 10 meshes with the frame 22, and increases the speed of the inward motion of the check piston, and, consequently, the resistance of the check. In this manner the check is rendered inoperative while the door is wide open, its power being reserved for the final operation of preventing slamming of the door.

The improvements in connection with the device shown in Figs. 1 and 2 consist in the combination of the improved frame 2; the tooth 10 and cam 43; the improved check frame 22, having a tooth 12, curved recess 44, and shoulder 46, severally operating as described to render the check inoperative while the door is wide open and bring its power into play for the final operation of preventing slamming of the door.

Figs. 3 and 4 illustrate another method of effecting a like operation. The guiding part of the sliding frame 16 is formed rectangular, as shown separately in Fig. 4. Over the spring frame 16 is fitted the check frame 17. The frame 16 has a square hole at 18, to receive the square end of the screw 19, which receives the regulating nut 4, for regulating the power of the spring 7. The frame 17 has a transverse slot 20 in which the roller 21, fitted to the arm 10, works.

The piston rod 14 is attached by a screw to the frame 17, whereby the movements of the arm 10 are communicated to the check 15; the check reacting upon the arm 10 to prevent slamming.

In the construction shown in Figs. 3 and 4 the improvements consist in the forms and combination of the frame 17 and the arm 10 and the operation thereof.

Figure 5:
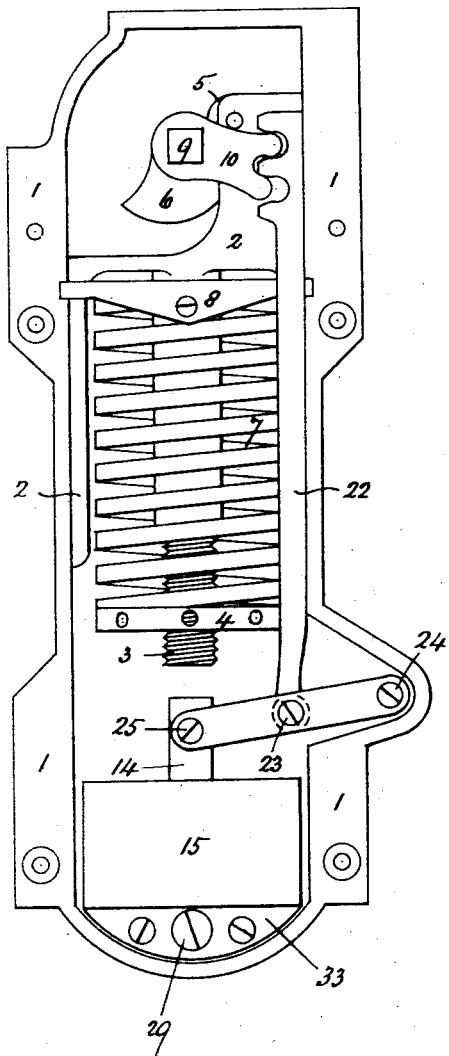

Fig. 5 illustrates another method of causing the fluid check to operate powerfully at the time the door is closing while rendering it inoperative when the door is wide open. One end of the bar 22 is provided with three teeth, which gear with the teeth on the lever 10, as shown. The other end of the bar 22 is pivoted at 23 to a lever of the third order, the fulcrum being at 24, and the junction with the piston rod 14 at 25.

Figure 6:
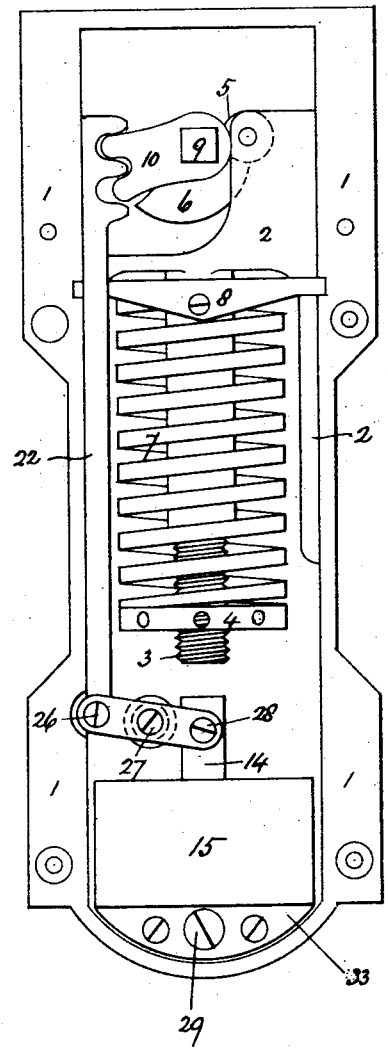

Fig. 6 illustrates another method of connecting the fluid check by means of a lever of the first order, pivoted to the rod 22 at 26; the fulcrum being at 27, and the connection with the piston rod 14 at 28.

The improvements shown in Figs. 5 and 6, consist in the operation, adaptation to and combination of levers with the fluid checks 15. The fluid checks may be made to oscillate upon centers at 29, or at any other convenient centers; but, preferably, they are fixed in position as shown in the drawings.

Figure 7:
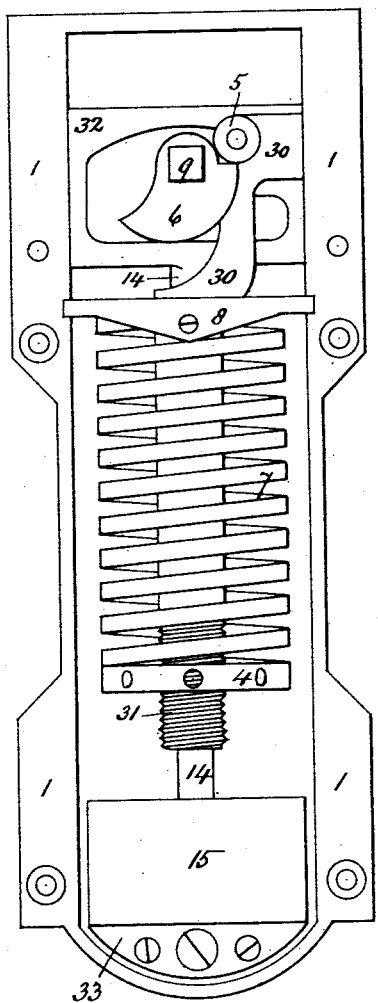
Figure 8:
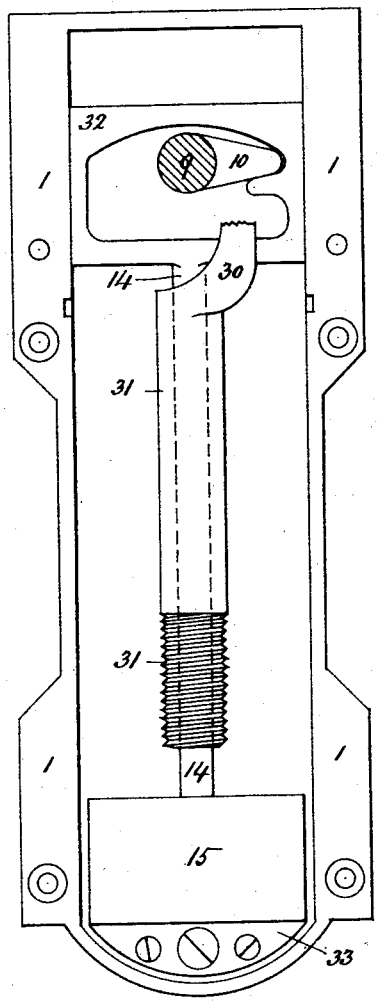

Figs. 7 and 8 illustrate another method of arranging the details, the operation broadly being the same as that effected by the construction and arrangements of parts hereinbefore described with reference to the other figures of the drawings. The frame 30 is formed in one with a sleeve 31, the lower end of which is shown screw threaded to receive the regulating nut 4. The piston rod 14 is carried through the sleeve 31 and attached to or formed in one with the frame 32. The piston rod 14 and sleeve 31 mutually act as guides and insure the parallel action of the mechanism. In Fig. 8 the spring 7 and nut 4, and other parts of the mechanism are omitted to show the details more clearly.

The improvements embodied in Figs. 7 and 8, consist in the combination of the spring frame 30 with the sleeve 31, and the combination of the check frame 32 with the elongated piston rod 14 and the novel operation of such combination of elements.

Figure 9:
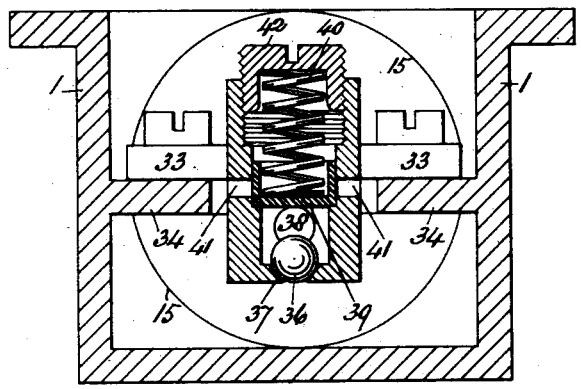

Fig. 9 is an enlarged view, partly in section, showing an improved construction of valve, fitted to the fluid check 15. 1, 1, is a section of the box. 15 is the fluid check cylinder. 33 is the flange attached to the cylinder, which flange is screwed to the rib 34 of the box 1. On the piston being drawn outward, the oil or other fluid enters the cylinder by raising the ball 36 from its seat 37, and by the passage 38. On the descent of the piston the ball 36 closes the passage 37. The fluid pressure then raises the cup valve 39, whereby the fluid is enabled to pass outward slowly through the passage 41. The pressure is regulated by the screw 42, compressing the spring 40, and thus regulating the pressure on the check piston.

The improvement in Fig. 9 consists in the application of the cup valve 39, which operates as an ordinary check and relief valve.

Figure 10:
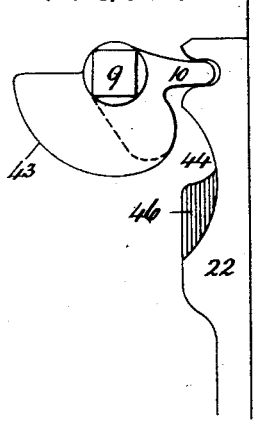
Figure 12:
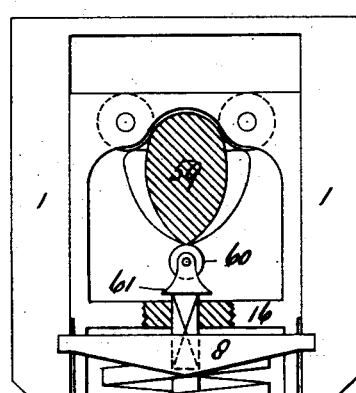
Figure 11:
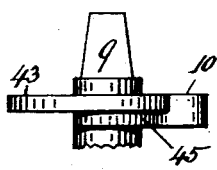
Figure 11:
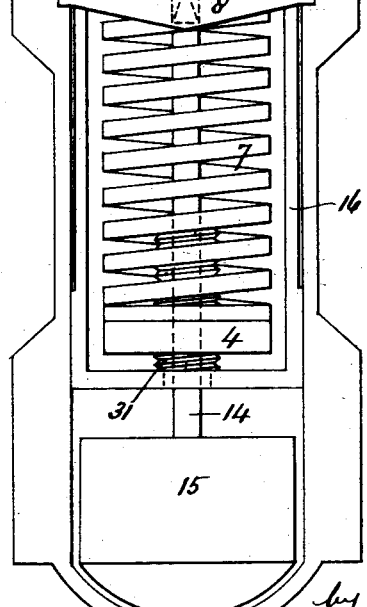

Fig. 10 is a plan view illustrating another form of the cam shown in Figs. 1 and 2; and Fig. 11 is an edge view of the cam and spindle. 9 is the spindle. 10 is a tooth meshing into the teeth on the check frame 22. The under side of the cam 43 is cut away to form a second cam 45, which engages with the shoulder 46 when the door is closing. The spindle 9 is fitted with the usual cam 6, as shown in Figs. 1 and 2, and operates in a similar manner.

The improvement consists in the combination of the tooth 10, cams 43 and 45, operating with the bar 22 upon the fluid check so as to prevent the slamming of the door and rendering the check inoperative while the door is wide open.

Figure 13:
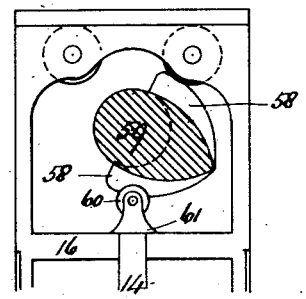
Figure 14:
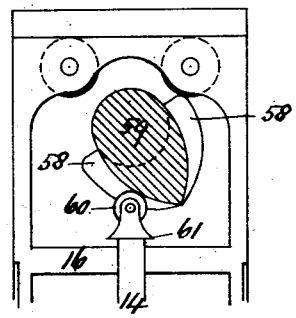
Figure 15:
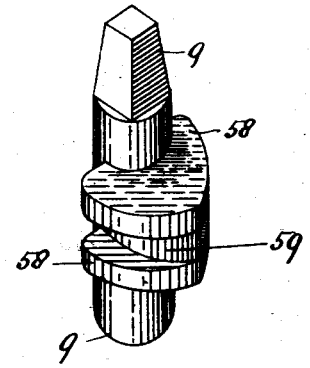

Figs. 12, 13, 14 and 15, illustrate the adaptation of my invention to double acting doors. The spindle, shown in perspective in Fig. 15, is fitted with two double-acting cams 58, for compressing the door spring 7, and an intermediate cam 59 for operating upon the door check, and receiving its counteraction on closing the door. The piston rod 14 of the fluid check 15, passes through a hole bored in the screw 31. 60 is a roller or its equivalent fitted to or formed on the rod or frame 14. When the door is being opened, as shown in Fig. 13, the cam 59 leaves contact with the roller 60, and the rod 14 is raised by its shoulder 61 being in contact with the moving frame 16 and when the door has been opened the check is rendered inoperative. On the door closing, as shown in Fig. 14, the cam 59 drives the rod 14 with accelerating motion, whereby the slamming of the door is prevented. The improvement consists in the combination, with the spindle 9, of the cam 59, operating upon the roller 16 or its equivalent and rod 14, for increasing the effectiveness of the fluid check just as the door is closing.

Figure 16:
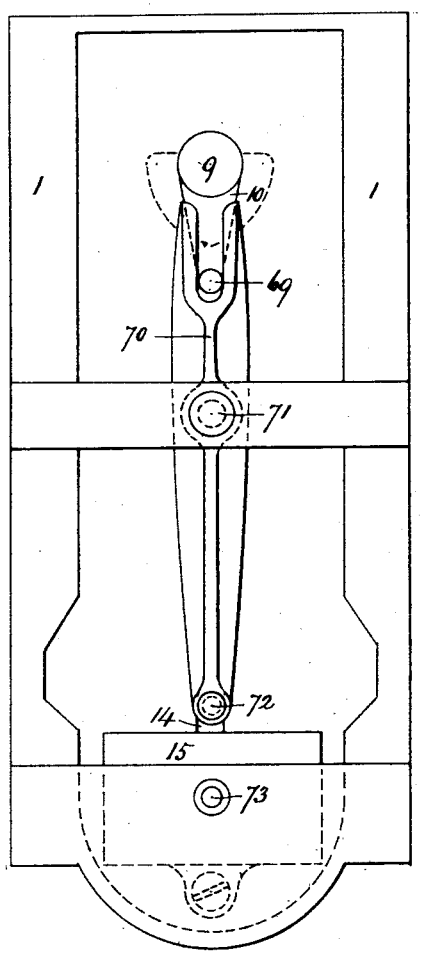
Figure 17:
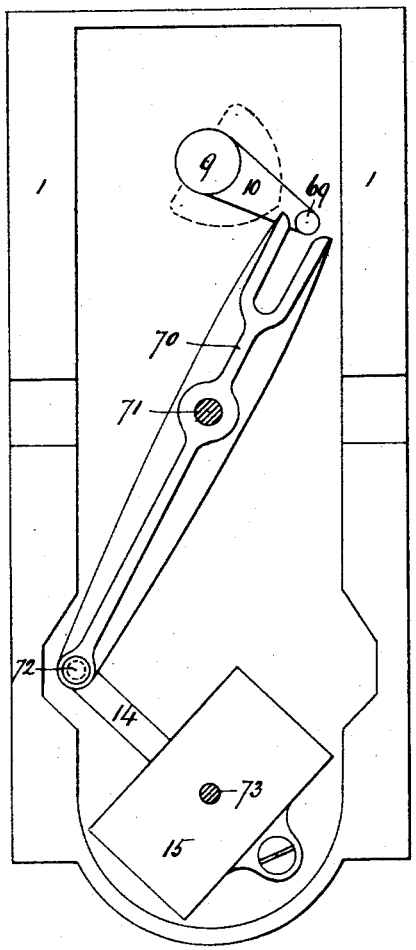

In Figs. 16 and 17 an arm or lever 10, having a pin 69, works in a forked lever 70, pivoted at 71. The fluid check cylinder is pivoted to the casting at 73, and the piston-rod 14 is pivoted to the lever 70 at 72. The position of the apparatus when the door is closed, is shown in Fig. 16, and the position, when the door is open, and the pin 69 is just leaving the fork, is shown in Fig. 17. The improvement consists in the combination of the arm 10 and pin 69; forked lever 70, pivoted at 72 to the piston-rod 14 of an oscillating fluid check pivoted at 73, or in any other position, whereby the check is rendered inoperative when the door is wide open and its power reserved for the final operation of preventing slamming of the door.

I claim—

1. In door-operating mechanism, the combination with a spindle and a check, of a movable element connected with said check, and a device connected to said spindle, said device disconnected from the movable element when the door is widely open and engaging said movable element in the closing of the door to operate the check, substantially as described.

2. In door-operating mechanism, the combination with a spindle and a check, of a sliding frame having a tooth 12, a recess 44, and a shoulder 46, a cam 43 carried by the spindle, and adapted to engage the recess 44, and a tooth 10 on said cam to engage the tooth 12 on the sliding frame, substantially as described.

Dated 26th day of October, 1893.

ROBERT ADAMS.

Witnesses:
   JOSEPH LAKE,
   T. F. BARNES,
*Both of No. 17 Gracechurch Street, London, E. C.*